US008313797B2

(12) United States Patent
Mack et al.

(10) Patent No.: US 8,313,797 B2
(45) Date of Patent: Nov. 20, 2012

(54) IN-SITU GROWTH OF MAGNETIC METAL NANOPARTICLES IN A MATRIX

(75) Inventors: Julia J. Mack, Encino, CA (US); Brian N. Cox, Thousand Oaks, CA (US); Vivek Mehrotra, Simi Valley, CA (US); Ten-Luen T. Liao, S. Pasadena, CA (US); Rahul Ganguli, Agoura Hills, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 642 days.

(21) Appl. No.: 12/424,465

(22) Filed: Apr. 15, 2009

(65) Prior Publication Data

US 2010/0264358 A1    Oct. 21, 2010

(51) Int. Cl.
*H01F 1/04* (2006.01)
(52) U.S. Cl. .................. 427/132; 427/229; 427/512
(58) Field of Classification Search ............ 427/132, 427/498, 512, 601, 169, 127, 128, 292, 594, 427/229
See application file for complete search history.

(56) References Cited

U.S. PATENT DOCUMENTS 5,759,230 A * 6/1998 Chow et al. .............. 75/362
2007/0290175 A1 * 12/2007 Kim .................. 252/500

OTHER PUBLICATIONS

Stephane Mornet et al., Magnetic Nanoparticle Design for Medical Diagnosis and Therapy, J. Mater. Chem., 2004, 14:2161-2175.
Zongtao Zhang et al., Synthesis of Ordered Metallic Nanowires Inside Ordered Mesoporous Materials Through Electroless Deposition, Chem. Mater., 2002, 14-3:965-968.
F. Fievet et al., Homogeneous and Heterogeneous Nucleations in the Polyol Process for the Preparation of Micron and Submicron Size Metal Particles, Solid State Ionics, 1989, 32-33:198-205.
G. Viau et al., Nucleation and Growth of Bimetallic CoNi and FeNi Monodisperse Particles Prepared in Polyols, Solid State Ionics, 1996, 84:259-270.
Suwen Liu et al., Preparation and Characteristics of Carbon Nanotubes Filled With Cobalt, Chem. Mater., 2000, 12-8:2205-2211.
Diane Ung et al., CoNi Nanowires Synthesized by Heterogeneous Nucleation in Liquid Polyol, Adv. Mater., 2005, 17-3:338-344.

* cited by examiner

*Primary Examiner* — Michael Cleveland
*Assistant Examiner* — Tabassom Tadayyon Eslami
(74) *Attorney, Agent, or Firm* — Glenn H. Lenzen; Husch Blackwell LLP

(57) ABSTRACT

Provided is a method for in-situ coating a substrate or matrix with magnetic metal nanoparticles. A metal salt, which may be organic or inorganic, is introduced into a solution of liquid polyol. In the presence of mechanical stirring and heat, a reduction process occurs wherein the magnetic metal nanoparticles precipitate out of solution and deposit or attach to one or more surfaces of the substrate. The concentration of reaction precursors, combined with the polyol, may be varied to control the size and shape of the magnetic nanoparticles.

17 Claims, 7 Drawing Sheets

IN-SITU GROWTH OF MAGNETIC METAL NANOPARTICLES IN A MATRIX

FIELD OF THE INVENTION

This invention relates generally to a method for coating a substrate or matrix with nanoparticles. More particularly, it relates to a process for coating a matrix through in-situ growth of magnetic metal nanoparticles.

BACKGROUND

Magnetic nanoparticles have potential applications in optics, electronics, micro-electronics, aerospace, biomedicine and other fields. For example, magnetic nanoparticles are often used as contrast enhancing agents for magnetic resonance imaging (MRI) systems (See e.g. Mornet et al., "Magnetic nanoparticle design for medical diagnosis and therapy," J. Mater. Chem., 2004, 14, 2161-75).

Magnetic nanoparticles are typically used in conjunction with a solid support structure, matrix or solid phase material. In at least one application disclosed in the prior art, nanoparticles are integrated into a solid phase. Several solid hosts, such as mesoporous silica (See e.g. Zhang et al., Chem. Mater., 2002, 14:1965) and carbon nanotubes (See e.g. Liu et al., Chem. Mater. 2000, 12:2205) have been used as templates for the growth of metal nanoparticles.

Alternatively, pre-formed nanoparticles may be deposited or otherwise coated onto the surface of a solid phase or matrix. Several issues may arise when coating a matrix using pre-formed nanoparticles. First, the coating methods used may not be compatible with the matrix, which is to say the matrix may not maintain its structural integrity and physical properties throughout the coating process. Further, depending on the coating methods and the solvent used, the nanoparticles may not adhere to the matrix with the necessary degree of affinity. Also, it may be very difficult to achieve uniform dispersion of the nanoparticles when coating a matrix with pre-formed nanoparticles. Non-uniformity may lead to inconsistent physical, electrical and/or chemical properties along the surface area of the coated matrix. There is, therefore a need for a coating method, that overcomes one or more of the problems discussed above.

Furthermore, because the magnetic property of a nanoparticle depends on the size and shape of the particle, there is also a need for a method to effectively control the size and shape of the nanoparticles being coated onto the matrix. Although Ung et al. demonstrates the correlation between particle size, shape and various reaction conditions (Adv. Mater. 2Q05, 17:338-44), no methodology has been established to control the size, shape and magnetic properties of magnetic nanoparticles in the context of in-situ matrix coating.

Hence there is a need for a material and method of manufacturing to address one or more of the drawbacks identified above.

SUMMARY

The materials and methods of manufacturing herein disclosed advance the art and overcome problems articulated above by providing a method for in-situ growth of magnetic nanoparticles for coating a selected matrix material.

In particular, and by way of example only, according to an embodiment, provided is a method for in-situ coating a matrix with magnetic nanoparticles, including: combining a metal precursor containing a metal salt with a liquid polyol to form a solution; introducing a matrix into the solution; stirring the solution; and heating the solution to a predetermined temperature, wherein the magnetic nanoparticles are formed through reduction of the metal salt, and further wherein the magnetic nanoparticles precipitate out of solution to form a coating on a surface of the matrix.

In another embodiment, provided is a coated matrix, including a substrate having one or more surfaces for coating and a plurality of magnetic nanoparticles, wherein the plurality of magnetic nanoparticles is formed through a reduction of a metal salt in a liquid polyol solution, and further wherein the magnetic nanoparticles precipitate out of the solution to form a coating in-situ on the one or more surfaces of the substrate.

In still another embodiment, provided is a method for in-situ coating a matrix with magnetic nanoparticles, including: introducing a precursor salt into a solution of liquid polyol; positioning the matrix within the precursor and polyol solution; stirring the solution; and heating the solution to a predetermined temperature, wherein the magnetic nanoparticles are formed through reduction of salts within the precursor, and further wherein the salts precipitate out of solution to form a coating of magnetic nanoparticles on a surface of the matrix.

DETAILED DESCRIPTION

Figure 1:
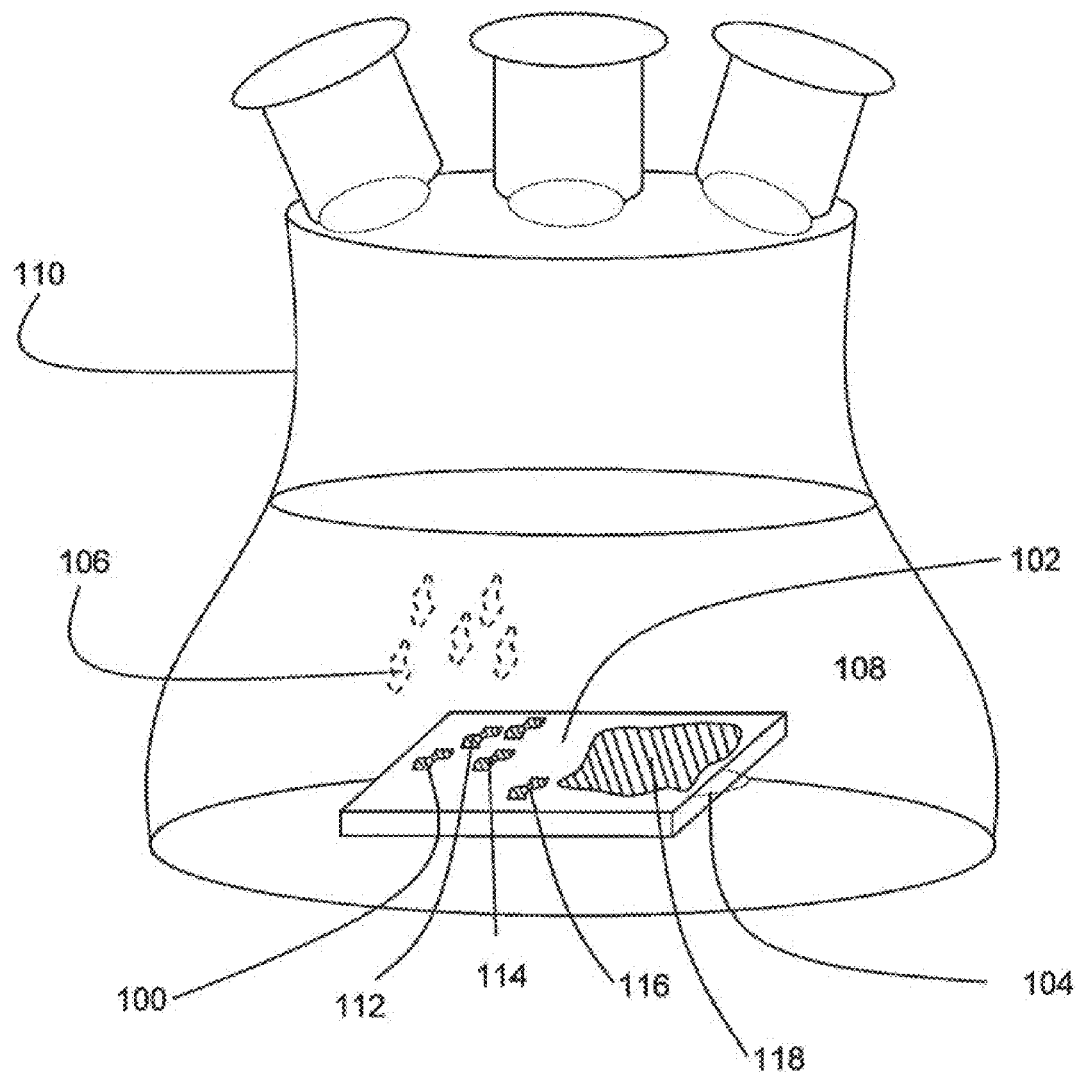
FIG. 1 is perspective view of the in-situ growth or magnetic metal nanoparticles, according to an embodiment.

Before proceeding with the detailed description, it should be noted that the present teaching is by way of example, not by limitation. The concepts herein are not limited to use or application with one specific method of magnetic metal nanoparticle in-situ growth. Thus, although the instrumentalities described herein are for the convenience of explanation, shown and described with respect to exemplary embodiments, the principles herein may be equally applied in other methods of in-situ growth of magnetic metal nanoparticles. Further, while the methods and materials disclosed herein may be applied to non-magnetic particles, magnetic metal nanoparticles are preferred. In one or more embodiments, ferromagnetic nanoparticles are the selected material for coating various matrices.

A method for coating magnetic metal nanoparticles onto a matrix or substrate is disclosed. The matrix may be any number of materials suitable for coating such as fabrics, fibers, scaffolds or foams. Typically, a suitable matrix material has a surface area sufficient to allow uniform, controlled coating by magnetic nanoparticles. The in-situ growth process enables a more uniform dispersion and infiltration of the particles within the pores of a matrix material than coating or deposition processes. Examples of such matrices may include, but are not limited to a porous ceramic body, including but not limited to barium titanate ($BaTiO_3$), alumina ($Al_2O_3$), silicon carbide (SiC), and silicon nitride ($Si_3N_4$); ceramic foam; polymer foam of varying porosity; a porous metal body; carbon foam; a ceramic felt; an alumina membrane; an alumina filter; Teflon® foam; carbon fibers or a metal foam formed from aluminum, titanium, tin, steel, lead or other suitable metals or alloy compositions. In at least one embodiment, the matrix is manufactured from a combination of different materials such as those listed above.

In determining the applicability of the disclosed process to a particular matrix, one consideration is the compatibility of an individual matrix to the reaction conditions of the reagents used (as discussed in greater detail below). For example, in at least one embodiment, the matrix or matrices may be immersed in solutions such as sodium hydroxide. It can be appreciated, therefore, that the matrices selected should not/may not react with sodium hydroxide. Moreover, the reduction reaction may require a heating process in which the temperature of the reaction mixture may be higher than 100° C. Thus, in one or more embodiments, the use of matrices that are stable and capable of sustaining temperature in excess of 100° C. is required.

In the context of this disclosure, the term "nanoparticle(s)" typically refers to particles of a size smaller than 100 nm. Magnetic metal nanoparticles may be prepared by either a chemical or physical process or method. Of these two methods, chemical synthesis is generally the more cost effective approach. More importantly, the structure of nanoparticles synthesized by chemical means is usually less size-dependent as compared to nanoparticles prepared by physical means. Since the magnetic properties of nanoparticles depend upon the structure of the particles, nanoparticles synthesized by chemical methods may be more versatile in applications across a broad range of particle size. Thus, in one at least one embodiment, chemical methods such as those disclosed herein are used to manufacture the magnetic nanoparticles which are subsequently coated, in-situ, onto the surface of a matrix. Examples of chemical methods that may be used for forming the magnetic nanoparticles include ion exchange, precipitation via heterogeneous nucleation or homogeneous nucleation, aqueous precipitation or nonaqueous precipitation. The size and shape of the magnetic nanoparticles may be varied depending on the synthesis method selected.

In one or more embodiments, a suitable solid inorganic or organic salt of a selected metal may be used as a precursor of the metal nanoparticles. While either inorganic or organic salts may be used, organic salts are most often used as precursors. Examples of suitable organic salts may include cobalt acetate tetrahydrate and nickel acetate tetrahydrate. Metals that confer strength at high temperature or resistance to creep are often used, thereby providing a stable, consistent coating on the selected matrix. In addition, properties such as resistance to corrosion, oxidation, carburization, sulfication or nitriding are also desirable. Examples of suitable metals include, but are not limited to, iron, cobalt, nickel, copper and titanium. As can be appreciated by those skilled in the art, the terms "bimetallic" and polymetallic", as used herein, refer to alloys in the form on nanoparticles containing two, or more, metals respectively. These metal alloys may be formed through bonding and may, therefore, have different rates of thermal expansion for the two or more metals present. The term "monometallic" refers to material containing one single metal. Although bimetallic nanoparticles are preferred in at least one embodiment, the nanoparticles of the present disclosure may contain one or more metals, which is to say they may be monometallic, bimetallic or polymetallic.

Referring now to FIG. 1, the magnetic nanoparticles, e.g. nanoparticle 100, may be synthesized in-situ on one or more surfaces (e.g. surface 102) of a selected matrix 104 through chemical reduction of one or more metal salts 106 (shown in phantom to represent an "in solution" condition) in a liquid polyol 108. The entire chemical reaction may be contained and completed in a flask, such as the three-neck flask 110 presented in FIG. 1.

Polyol refers to chemical compounds containing multiple hydroxyl groups. Liquid polyols suitable for the present disclosure may include polyols and their derivatives that are in liquid state at room temperature. By way of example, these may include glycerol, di-ethelene glycol, and 1,2-propanediol. Among these, glycerol has the highest boiling point of about 290° C., while ethylene glycol and 1,2-propaneidiol both have a boiling point below 200° C. In at least one embodiment, 1,2-propaneidiol is used based on its relatively low boiling point. The polyol 108 may function as both a solvent and a reducing agent (See Viau et al., Solid State Ionics, 1996, 84:259).

The reduction reaction may be carried out in the presence of one or more matrices, e.g. matrix 104. The matrix 104 or matrices may be added to the polyol solution 108 prior to or at the time the metal salts 106 are added to the polyol solution 108. The magnetic metal nanoparticles, such as nanoparticles 112, 114 and 116, are generated through the reduction of metal salts 106 in solution 108, and are thereby deposited on the surface 102 of the matrix 104 or matrices. Different reaction conditions may be applied based on the different types of matrix 104 used and the desired size and shape of the nanoparticles 112-114. In addition, the morphology of the nanoparticles 112-114 may be controlled by altering the concentration of various reaction precursors, such as the metal salts 106, a reducing agent or sodium hydroxide (if present).

The procedure for synthesizing the nanoparticles is substantially as described by Fievet et al. in Solid State Ionics, 1989, 32.33:198, and Ung et al. in Adv. Mater., 2005, 17:338-44, both of which are hereby incorporated by reference. In general, the metal salt 106 may be first suspended in liquid polyol 108. The solution or suspension may then be stirred and heated within flask 110 to a given temperature. In one embodiment, the suspension may be preferably heated to the boiling point of the polyol 108 to facilitate the reduction reaction and thus the formation of magnetic nanoparticles, such as nanoparticles 112, 114 and 116, on the surface of a matrix.

In particular, the prior art discloses a method to obtain monodisperse, bimetallic CoNi (cobalt/nickel) nanoparticles by heating a mixture of cobalt acetate and nickel acetate salts in a-diols up to the boiling point of the mixture (Fivet et al., Solid State Ionics, 1989, 32/33:198). In this reaction, the precipitation of an unreduced solid phase containing Co2+ and Ni2+ species takes place at a lower temperature than the reduction reaction. The dissolution of this phase may be used to control the growth of the magnetic metal nanoparticles in the solution, and hence on the surface of a matrix present in solution. (See Viau, et al., Solid State Ionics, 1996, 84:259). This method is used, as disclosed herein, in a manner unanticipated by the prior art to in-situ deposit or coat magnetic nanoparticles of a known or predictable size, shape, magnetic properties, etc., thereby providing a more uniform coating 118 on the matrix 104 surface 102.

Figure 3A:
FIG. 3A is a photomicrograph of a metal acetate nanoparticle formation at a given Co—Ni ratio.

Of note, in one embodiment of the present disclosure, cobalt and nickel bimetallic nanoparticles (e.g. nanoparticles 112-116) may be generated in-situ at a predetermined ratio in the presence of a matrix, e.g. matrix 104. For example, consistent with the work performed by Ung et al., a mixture of cobalt and nickel acetates with a desired Co/Ni molar ratio may be dissolved in 1.2-propanediol, along with ruthenium chloride and sodium hydroxide, and subsequently heated to 170° C. As reported by Ung et al., the Co/Ni molar ratio in the resultant metal powder is typically found to be the same as the Co/Ni elemental ratio in the starting materials (Adv. Mater. 2005, 17:338-44). Accordingly, the Co/Ni molar ratio of the Co/Ni nanoparticles in the present disclosure may range from about 80/20 to about 40/60, and is very predictable. An example of particle morphology as a function of the Co—Ni molar ratio is illustrated in FIG. 3A. A small amount of chromium, molybdenum, titanium or niobium may be present in the final coating to confer upon the coating certain advantageous properties such as thermal stability, strength, etc.

Figure 3B:
FIG. 3B is a photomicrograph of a heterogeneous nucleation specimen using ruthenium as a nucleating agent.
Figure 3C:
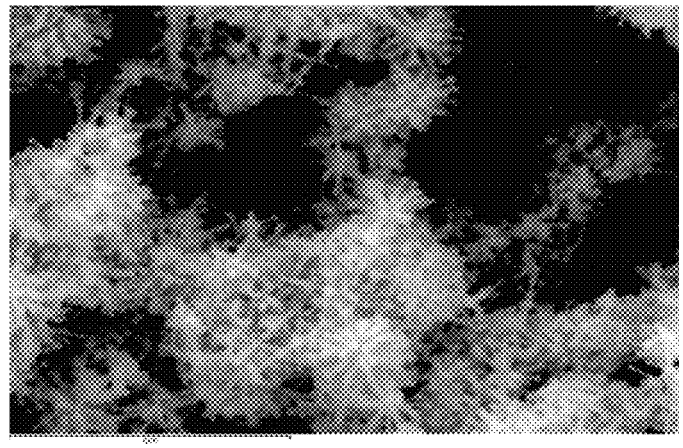
FIG. 3C is a photomicrograph of particle morphology as a result of varying the sodium hydroxide concentration.

In at least one embodiment of the present disclosure, the reduction of metallic salts by polyol may be carried out in the presence of sodium hydroxide. As shown in FIG. 3C, the concentration of sodium hydroxide may need to be carefully controlled and monitored, as the concentration of sodium hydroxide may have significant effects on the morphology, structure, or magnetic properties of the nanoparticles formed and coated onto the matrix (See e.g. Ung et al., Adv. Mater., 2005 17:338-44). The use of different nucleating agents may also affect the size and other properties of the nanoparticles. For example, as disclosed by Ung et al., platinum seeds obtained by adding $K_2PtCl_4$ in-situ were particularly useful in decreasing the size of magnetic particles by two orders of magnitude (Adv. Mater. 2005, 17:339). In one embodiment as illustrated in FIG. 3B, the particle nucleation was controlled by using ruthenium as a nucleating agent.

In yet another embodiment of the present disclosure, surfactant molecules may be included in the reaction to afford anisotropic growth of the magnetic nanoparticles on the matrix through a self-organization process. The process may be used to manufacture electronic components, etc. with a particular size, shape and orientation to the magnetic particles. For example, nickel nanorods and cobalt nanowires have been previously obtained in this manner through hydrogenation of organometallic compounds in the presence of a mixture of alkylamines, alkyl acids, or alkyiphosphines (See e.g. Dhenaut et al., Nature, 1995, 374:339; Zyss et al., Chem Mater. 2003, 15:3063; Cho et al., Chem. Mater. 2001, 13:1438; Brasselet and Zyss, J. Opt. Soc. Am. B. 1998, B 15:257).

EXAMPLE 1

In-Situ Growth of Magnetic Nanoparticles in a Matrix

In a particular application of the method disclosed herein, cobalt (II), nickel (II) acetate tetrahydrate, and 1,2-propanediol was purchased from commercial sources. Four (4) grams of a mixture of cobalt and nickel acetate tetrahydrate, in a desired Co/Ni ratio, was dissolved in 50 mL of 1,2-propanediol. Sodium hydroxide was added to 150 mL of 1,2-propanediol. These amounts correspond to cobalt and nickel concentration of 0.08 mol/L in 200 mL of polyol. A matrix to be coated was placed in a 500 mL three-necked flask. The Co/Ni and NaOH solutions were also added to the same flask and mixed. The mixture was then heated to 170° C. and stirred mechanically. When reduction was complete, after approximately 30 minutes at 170° C., the mixture was allowed to cool to room temperature. During the process, a substantially uniform coat, e.g. coat 118 as illustrated in FIG. 1, of magnetic nanoparticles was formed on the surface of the matrix, as illustrated in FIG. 1. The matrix was then removed from the flask and washed three (3) times by ethanol and allowed to dry in the air at 50° C.

Figure 2:
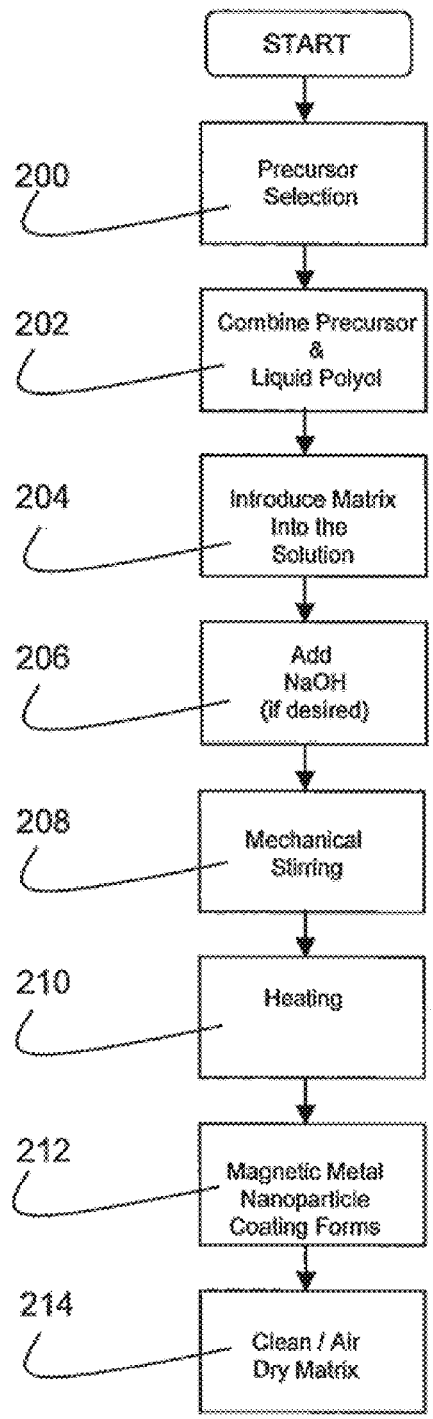
FIG. 2 is a flow chart of a method for in-situ growth of magnetic metal nanoparticles, according to an embodiment.

Referring now to FIG. 2, a method for in-situ growth of magnetic metal nanoparticles on a substrate or matrix is summarized in flow chart form. In particular, the first step in the process is the selection of a precursor for forming the magnetic nanoparticles, block 200. As noted above the precursor may contain one or more metal salts. The precursor is combined with a liquid polyol, block 202, to form the liquid solution which is the basis of the reduction reaction required. Typically, the combined solution is contained in a chemist flask capable of sustaining some degree of mechanical stirring and high temperature heating. A substrate or matrix is introduced into the combined precursor/polyol solution, block 204, and it is this matrix upon which the coating will form in-situ. In at least one embodiment, sodium hydroxide may also be included in the flask, to enhance the reduction of the metal salt in solution, block 206.

The combined materials contained within the flask are both mechanically combined or stirred (block 208) and heated (block 210) to a predetermined temperature which may or may not be at or above the boiling point of the polyol. At the appropriate temperature, magnetic metal nanoparticles precipitate out of solution and form a coating on the surface of the matrix, block 212. The size, shape, orientation and properties of the particles, as well as the uniformity and consistency of the coating, all depend on the materials and processes used, such as the matrix material and composition, the metal salts, the presence or absence of sodium hydroxide, etc. Once the in-situ coating process is complete, the flask is drained, the matrix is washed and allowed to air dry for a period of time, block 214.

Figure 4A:
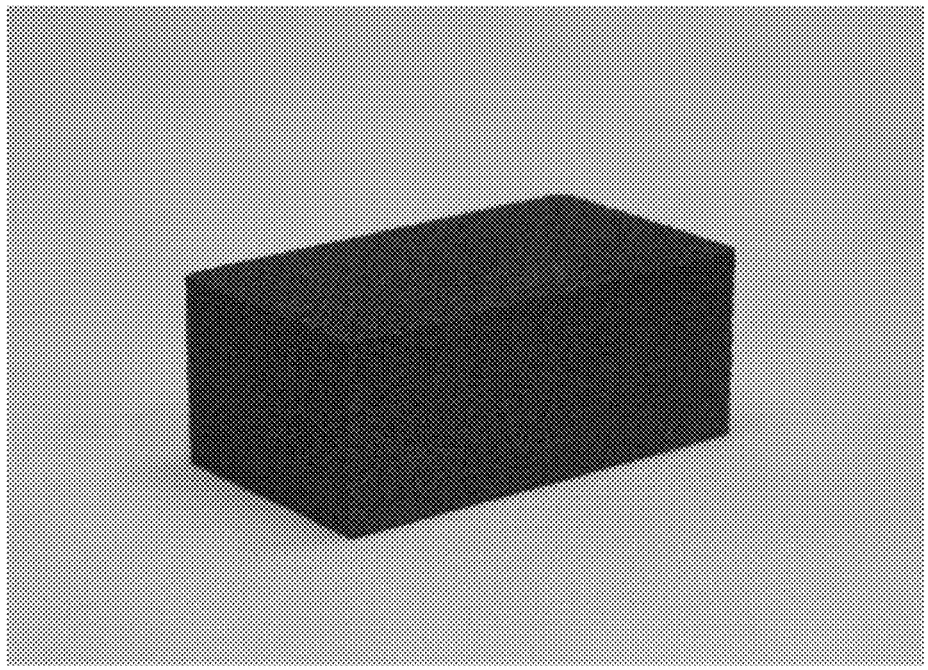
FIG. 4A illustrates a sample of commercially available carbon foam.
Figure 4B:
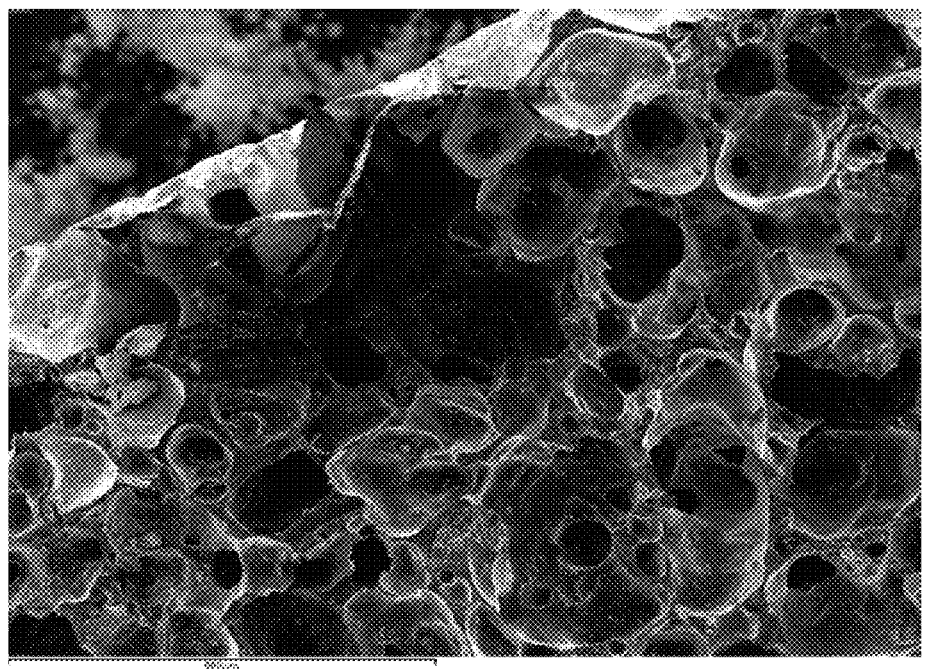
FIG. 4B is a higher magnification view of the surface of the carbon foam sample of FIG. 4A.
Figure 5:
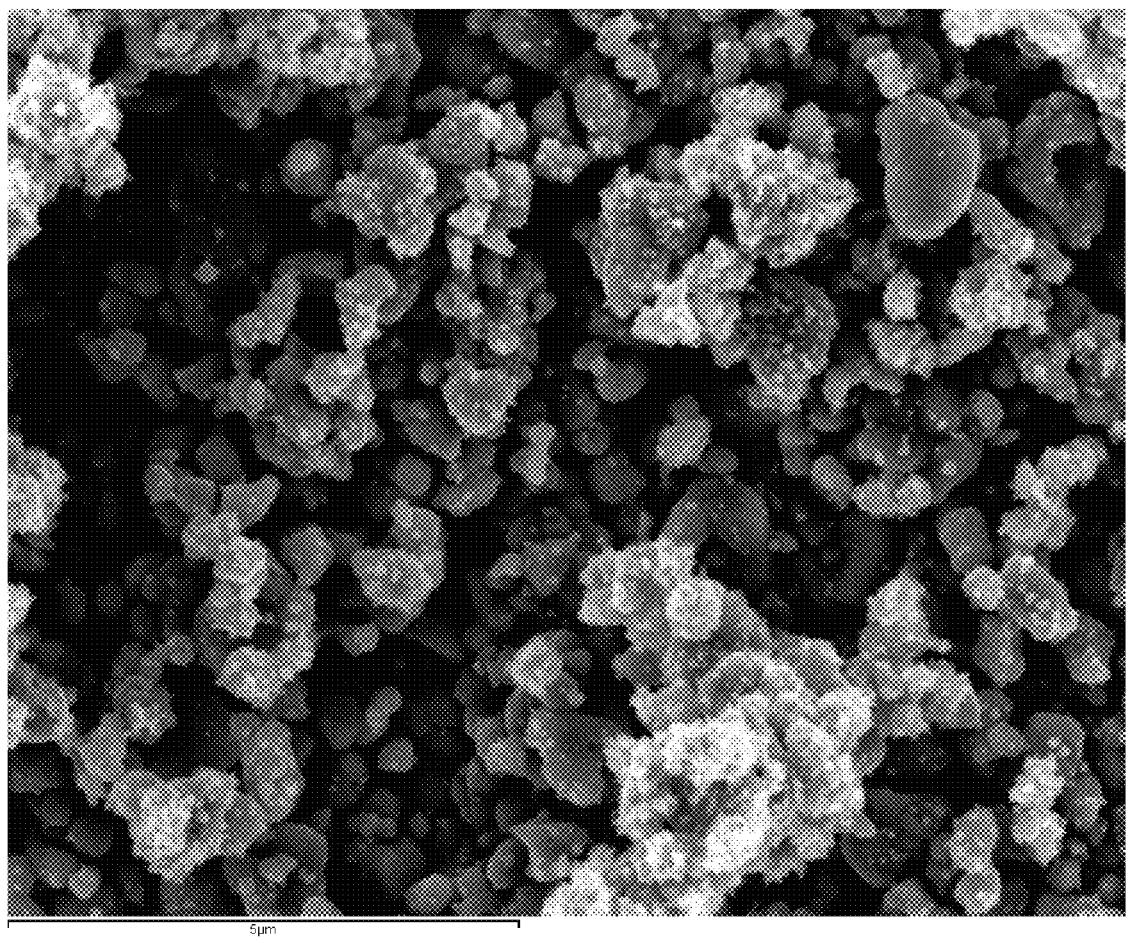
FIG. 5 is a photomicrograph of nanoparticle growth on a barium titanate matrix.
Figure 6A:
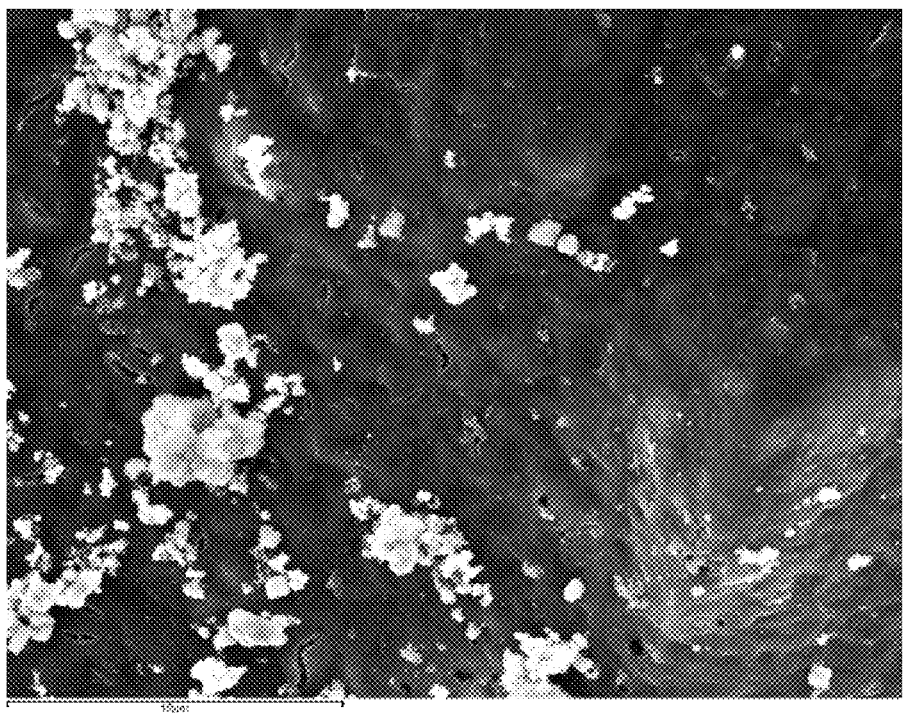
FIGS. 6A and 6B are photomicrographs of nanoparticle growth on a carbon foam matrix.
Figure 6B:
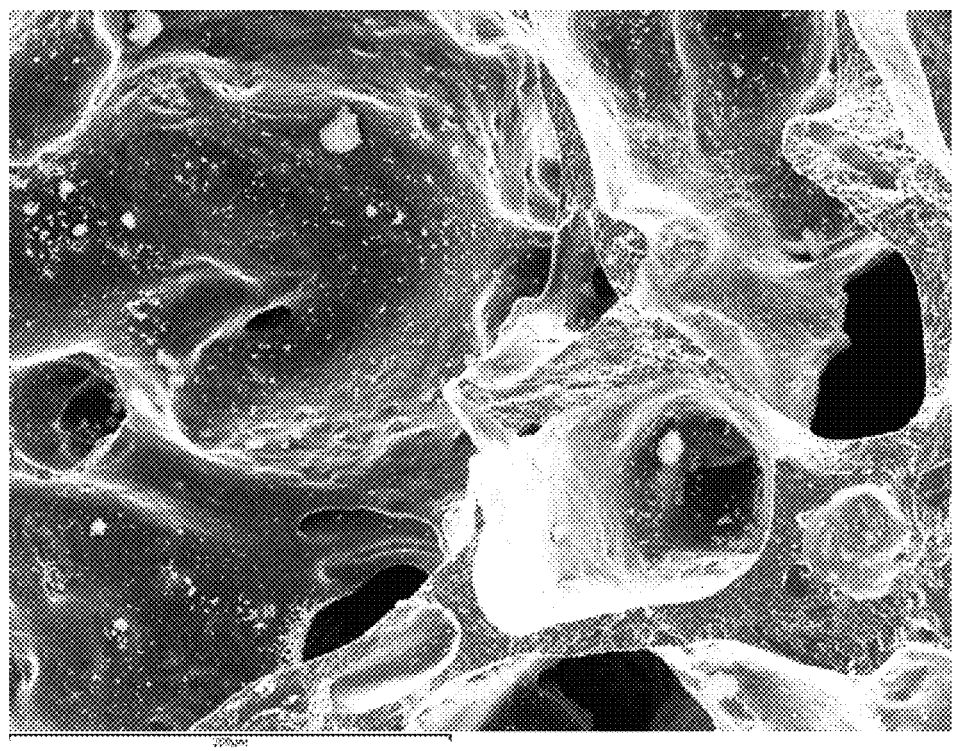

Two example matrices tested were a barium titanate matrix, which was formed via powder pressing, and a carbon foam, which is commercially available from Touchstone Research Laboratory with 50 to 100 micron-sized pores. The carbon foam is shown in block form and microscopically in FIGS. 4A and 4B respectively. CoNi nanoparticles were precipitated on and within the porous matrices by adding to the precursor solution as described above. The precursor solution was composed of cobalt acetate, nickel acetate, ruthenium chloride and sodium hydroxide. The ratios of each can be varied according to the desired Co—Ni composition. The reaction was run under vacuum at 170° C. for twenty minutes. Scanning electron microscopy (SEM) analysis post reaction indicated a uniform coating and distribution of the magnetic CoNi nanoparticles within the porous matrices. Nanoparticle growth on the $BaTiO_3$ matrix is shown in the photomicrograph of FIG. 5 and on the carbon foam in FIGS. 6A and 6B.

Figure 7:
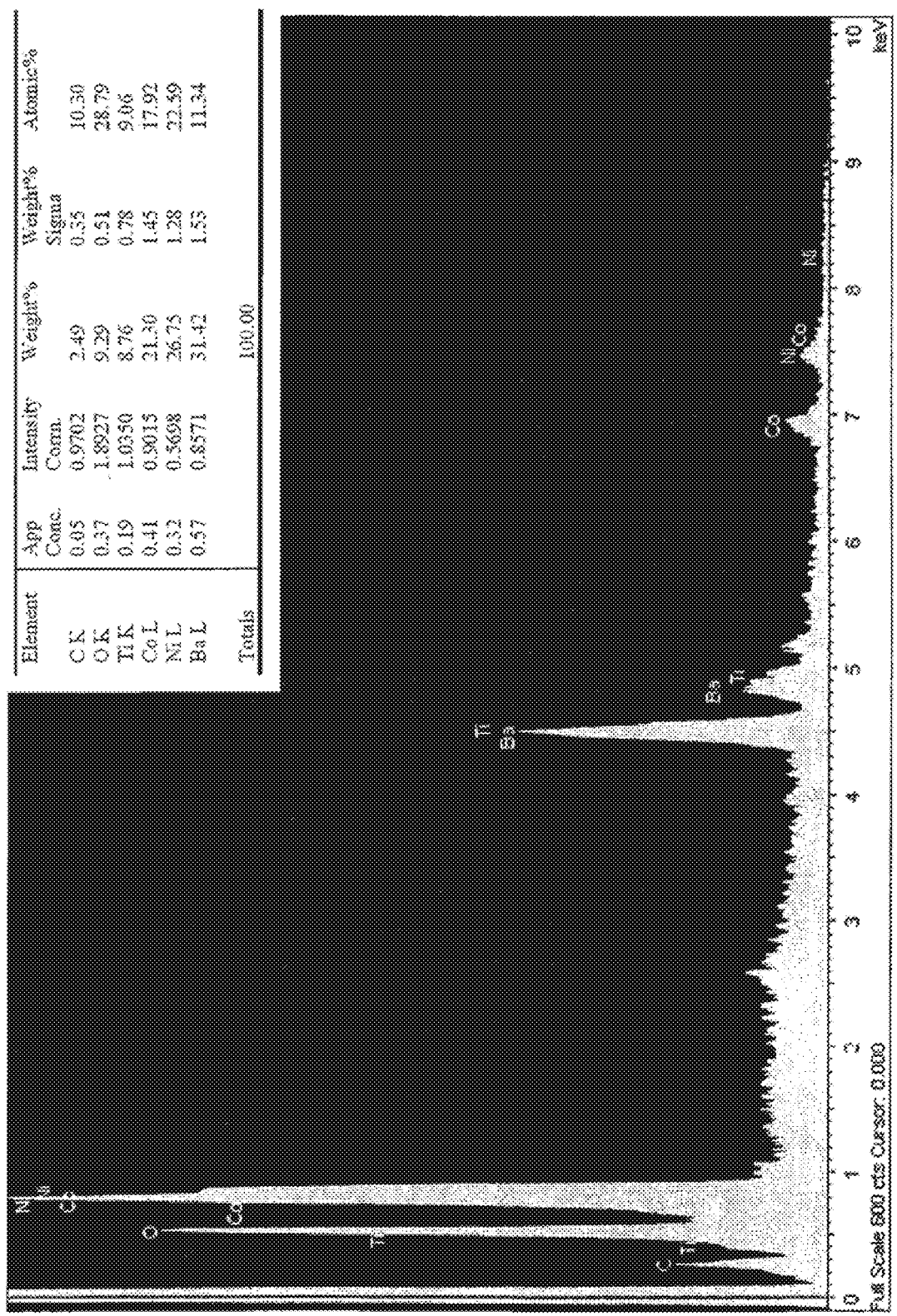
FIG. 7 is an energy dispersive spectroscopy (EDS) scan of a treated substrate illustrating the presence of particles throughout the thickness of the matrix substrate.

Energy dispersive spectroscopy (EDS) was used in conjunction with SEM to confirm the presence of the magnetic particles throughout the thickness of the matrices, as shown if FIG. 7. In-situ growth of CoNi nanoparticles is possible on many types of porous and non-porous matrices so long as the matrix material is capable of withstanding the reaction conditions (basic pH and 170° C.).

The materials, chemicals and other ingredients are presented as typical components or reagents, and the procedures described herein may represent but one of the typical ways to accomplish the goals of the particular procedure. Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

Further, the prior art cited herein, while incorporated by reference, does not fully encompass or disclose the elements of the present invention. As such, the present disclosure expands upon, in a novel direction and manner, the prior art, which has not to date been applied as presented herein, nor is the invention(s) of the present disclosure anticipated by the art cited.

What is claimed is:

1. A method for in-situ coating a matrix with magnetic nanoparticles comprising:
    combining a metal precursor, containing a metal salt, with a liquid polyol to form a solution;
    introducing a matrix into the solution;
    stirring the solution; and
    heating the solution to a predetermined temperature,
    wherein the magnetic nanoparticles are formed through reduction of the metal salt, wherein the magnetic nanoparticles precipitate out of solution to form a coating on a surface of the matrix and wherein the matrix is selected from a group consisting of: a porous ceramic body, ceramic foam, polymer foam of varying porosity, a porous metal body, carbon foam, a ceramic felt, an alumina membrane, an alumina filter, a metal foam and carbon fibers.

2. The method of claim 1, wherein the magnetic nanoparticles are bimetallic.

3. The method of claim 1, wherein the magnetic nanoparticles are polymetallic.

4. The method of claim 1, wherein the magnetic nanoparticles are ferromagnetic.

5. The method of claim 1, wherein the forming includes a chemical process selected from a group consisting of precipitation via heterogeneous nucleation, precipitation via homogeneous nucleation, aqueous precipitation, and nonaqueous precipitation.

6. The method of claim 1, wherein sodium hydroxide is introduced into the solution.

7. The method of claim 1, wherein surfactant molecules may be included to effect anisotropic growth of the magnetic nanoparticles.

8. The method of claim 1, wherein the forming includes precipitation via heterogeneous nucleation.

9. The method of claim 8, further comprising controlling the heterogeneous nucleation with ruthenium as a nucleating agent.

10. The method of claim 1, wherein the forming includes precipitation via homogeneous nucleation.

11. The method of claim 10, further comprising controlling the homogeneous nucleation with ruthenium as a nucleating agent.

12. The method of claim 1, wherein the forming includes precipitation via aqueous precipitation.

13. The method of claim 1, wherein the metal salt is an organic salt.

14. The method of claim 13, wherein the organic salt is selected from a group consisting of: cobalt acetate tetrahydrate and nickel acetate tetrahydrate.

15. The method of claim 1, wherein the magnetic nanoparticles are metal.

16. The method of claim 15, wherein the metal is selected from a group consisting of: iron, cobalt, nickel, copper and titanium.

17. The method of claim 15, wherein the magnetic nanoparticles are a compound of cobalt and nickel.

* * * * *